(12) United States Patent
Kato

(10) Patent No.: US 11,595,400 B2
(45) Date of Patent: Feb. 28, 2023

(54) INFORMATION PROCESSING SYSTEM, INFORMATION PROCESSING APPARATUS, AND NON-TRANSITORY COMPUTER READABLE MEDIUM STORING PROGRAM

(71) Applicant: FUJIFILM Business Innovation Corp., Tokyo (JP)

(72) Inventor: Junya Kato, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 103 days.

(21) Appl. No.: 16/931,409

(22) Filed: Jul. 16, 2020

(65) Prior Publication Data
US 2021/0306345 A1     Sep. 30, 2021

(30) Foreign Application Priority Data
Mar. 24, 2020   (JP) .............................. JP2020-053374

(51) Int. Cl.
  *H04L 9/40*     (2022.01)
(52) U.S. Cl.
  CPC ............ *H04L 63/105* (2013.01); *H04L 63/08* (2013.01); *H04L 63/20* (2013.01)
(58) Field of Classification Search
  CPC ....... H04L 63/105; H04L 63/08; H04L 63/20; H04L 63/18; H04L 2463/082
  USPC ............................................................ 726/4
  See application file for complete search history.

(56) References Cited

U.S. PATENT DOCUMENTS

| | | | | |
|---|---|---|---|---|
| 7,367,063 | B1 * | 4/2008 | O'Toole, Jr. .......... | G06F 21/554 726/34 |
| 2008/0034207 | A1 * | 2/2008 | Cam-Winget ...... | H04W 12/068 713/163 |
| 2010/0085152 | A1 * | 4/2010 | Fukuda .................... | G07C 9/37 340/5.82 |
| 2012/0102559 | A1 * | 4/2012 | Yoshida .............. | G06F 21/6245 726/7 |
| 2017/0011210 | A1 * | 1/2017 | Cheong .................. | A61B 5/681 |

FOREIGN PATENT DOCUMENTS

JP        2015032108      2/2015

* cited by examiner

*Primary Examiner* — Noura Zoubair
*Assistant Examiner* — Aubrey H Wyszynski
(74) *Attorney, Agent, or Firm* — JCIPRNET

(57) ABSTRACT

An information processing system includes: a first authentication unit that authenticates a user by a first method; a first providing unit that provides a service to the user authenticated by the first authentication unit; a second authentication unit that authenticates a user by a second method; and a second providing unit that provides a service to the user authenticated by the second authentication unit and also provides a service to the user authenticated by the first authentication unit in a case where the first method satisfies a condition determined according to the second method.

11 Claims, 5 Drawing Sheets

FIG. 5

| SERVICE PROVIDING SCREEN ||
|---|---|
| PLEASE LOG IN ||
| USER NAME | ID00101 — A11 |
| PASSWORD | .... — A12 |
| ONE-TIME PASSWORD | .... — A13 |
| LOGIN BY FIRST AUTHENTICATION METHOD — B1 ||

FIG. 6

| SERVICE PROVIDING SCREEN ||
|---|---|
| PLEASE LOG IN ||
| USER NAME | ID-0302 — A21 |
| PASSWORD | .... — A22 |
| LOGIN BY FIRST AUTHENTICATION METHOD — B2 ||
| LOGIN BY SECOND AUTHENTICATION METHOD — B3 ||

FIG. 7

| REGISTERED USER ID OF FIRST METHOD | REGISTERED USER ID OF SECOND METHOD |
|---|---|
| ID00101 | ID-0302 |
| ID02847 | ID-0482 |
| ... | ... |

INFORMATION PROCESSING SYSTEM, INFORMATION PROCESSING APPARATUS, AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2020-053374 filed Mar. 24, 2020.

BACKGROUND

(i) Technical Field

The present invention relates to an information processing system, an information processing apparatus, and a non-transitory computer readable medium storing a program.

(ii) Related Art

In JP2015-032108A, in a case of use of a cloud service, an authentication operation according to authentication contents is performed, and the cloud service can be used in a case where authentication is completed. In addition, there is described a technique of requesting, depending on a use status of the cloud service, authentication different from the authentication contents at the start of use.

SUMMARY

As in a cloud service, in a service provided via a communication line such as the Internet, the service is also provided to a user authenticated in another service. However, this method may cause a problem in that a service is provided to a user authenticated in a service having a low security level.

Aspects of non-limiting embodiments of the present disclosure relate to an information processing system, an information processing apparatus, and a non-transitory computer readable medium storing a program capable of improving safety in providing of a service, which is also provided to a user authenticated in another service, as compared with a case where users for whom the service can be provided are not limited.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing system including: a first authentication unit that authenticates a user by a first method; a first providing unit that provides a service to the user authenticated by the first authentication unit; a second authentication unit that authenticates a user by a second method; and a second providing unit that provides a service to the user authenticated by the second authentication unit and also provides a service to the user authenticated by the first authentication unit in a case where the first method satisfies a condition determined according to the second method.

BRIEF DESCRIPTION OF THE DRAWINGS

Exemplary embodiment(s) of the present invention will be described in detail based on the following figures, wherein:

FIG. 5 is a diagram illustrating an example of a login screen;

FIG. 6 is a diagram illustrating another example of the login screen;

FIG. 7 is a diagram illustrating an example of associated user identification information;

DETAILED DESCRIPTION

1. Exemplary Embodiment

Figure 1:
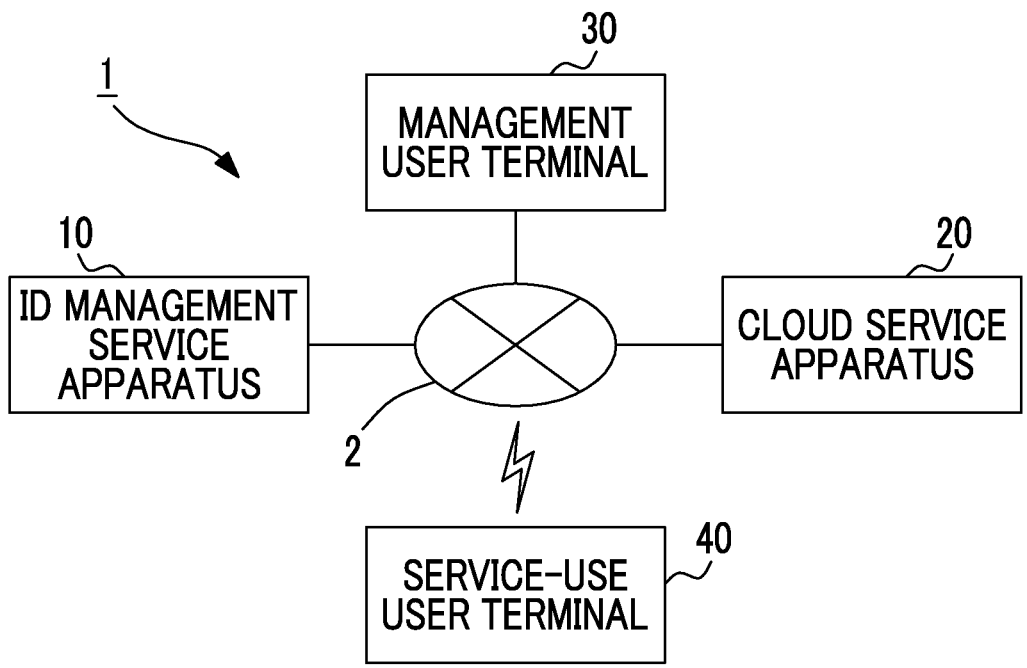
FIG. 1 is a diagram illustrating an overall configuration of an authentication cooperation system according to an exemplary embodiment.

FIG. 1 illustrates the overall configuration of an authentication cooperation system 1 according to an exemplary embodiment. The authentication cooperation system 1 is a system that performs processing of cooperating for an authentication function, and is an example of an "information processing system" of the present disclosure. The authentication function is a function of authenticating a user based on unique information for each user. For the user authenticated by the authentication function, for example, a service registered by the user is provided.

The authentication cooperation system 1 includes a communication line 2, an ID management service apparatus 10, a cloud service apparatus 20, a management user terminal 30, and a service-use user terminal 40. The communication line 2 is included in a communication system including a mobile communication network, the Internet, and the like, and relays data exchange between apparatuses that access the communication system. The ID management service apparatus 10, the cloud service apparatus 20, and the management user terminal 30 access the communication line 2 by wired communication, and the service-use user terminal 40 accesses the communication line 2 by wireless communication. The access to the communication line 2 may be wired or wireless.

Each of the ID management service apparatus 10 and the cloud service apparatus 20 manages a user ID, which is identification information of a user registered as a user of a service provided by the ID management service apparatus 10 and the cloud service apparatus 20. Each of the ID management service apparatus 10 and the cloud service apparatus 20 provides a service to a user authenticated based on the managed user ID. Further, the ID management service apparatus 10 and the cloud service apparatus 20 perform processing related to cooperation of the authentication function.

The management user terminal 30 is a terminal used by an administrator of the cloud service apparatus 20. The management user terminal 30 receives, for example, an operation related to the cooperation of the authentication function. The service-use user terminal 40 is a terminal used by a user who is registered for use of a service provided by the cloud service apparatus 20 or a user who is registered for use of a service provided by the ID management service apparatus 10.

Figure 2:
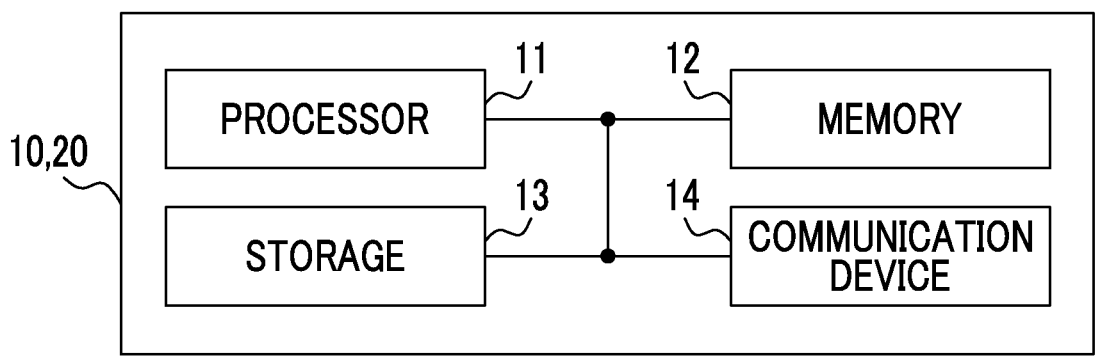
FIG. 2 is a diagram illustrating a hardware configuration of a service apparatus.

FIG. 2 illustrates a hardware configuration of the service apparatus. The service apparatus is the ID management service apparatus 10 or the cloud service apparatus 20. The service apparatus is a computer including a processor 11, a memory 12, a storage 13, and a communication device 14. The processor 11 includes, for example, an arithmetic device such as a central processing unit (CPU), a resistor, and a peripheral circuit. The memory 12 is a recording medium that can be read by the processor 11, and includes a random access memory (RAM) and a read only memory (ROM).

The storage 13 is a recording medium that can be read by the processor 11, and includes, for example, a hard disk drive or a flash memory. The processor 11 controls an operation of each hardware by executing a program stored in the ROM or the storage 13 using the RAM as a work area. The communication device 14 is a communication unit that includes an antenna, a communication circuit, and the like, and performs communication via the communication line 2.

Figure 3:
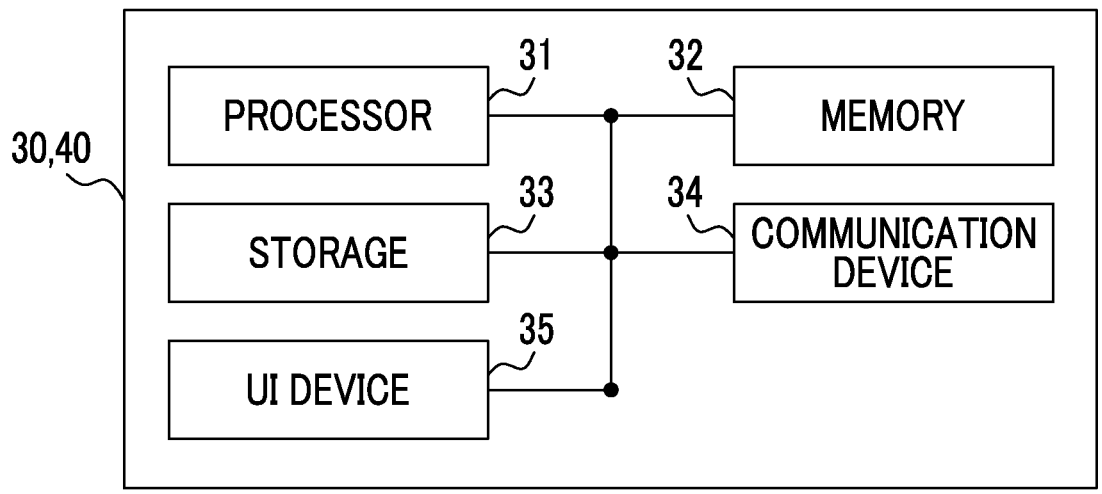
FIG. 3 is a diagram illustrating a hardware configuration of a user terminal.

FIG. 3 illustrates a hardware configuration of the user terminal. The user terminal is the management user terminal 30 or the service-use user terminal 40. The user terminal is a computer including a processor 31, a memory 32, a storage 33, a communication device 34, and a user interface (UI) device 35. The processor 31 to the communication device 34 are the same type of hardware as the processor 11 to the communication device 14 illustrated in FIG. 2.

The UI device 35 is an interface provided to a user who uses the user terminal. The UI device 35 includes, for example, a touch screen including a display as a display unit and a touch panel provided on a front surface of the display, displays an image, and receives an operation from the user. In addition to the touch screen, the UI device 35 includes operators such as a keyboard and receives operations on the operators.

In the authentication cooperation system 1, the processor of each apparatus controls each unit by executing a program, and thus each function to be described below is realized. An operation performed by each function is also represented as an operation performed by the processor of the apparatus that realizes the function.

Figure 4:
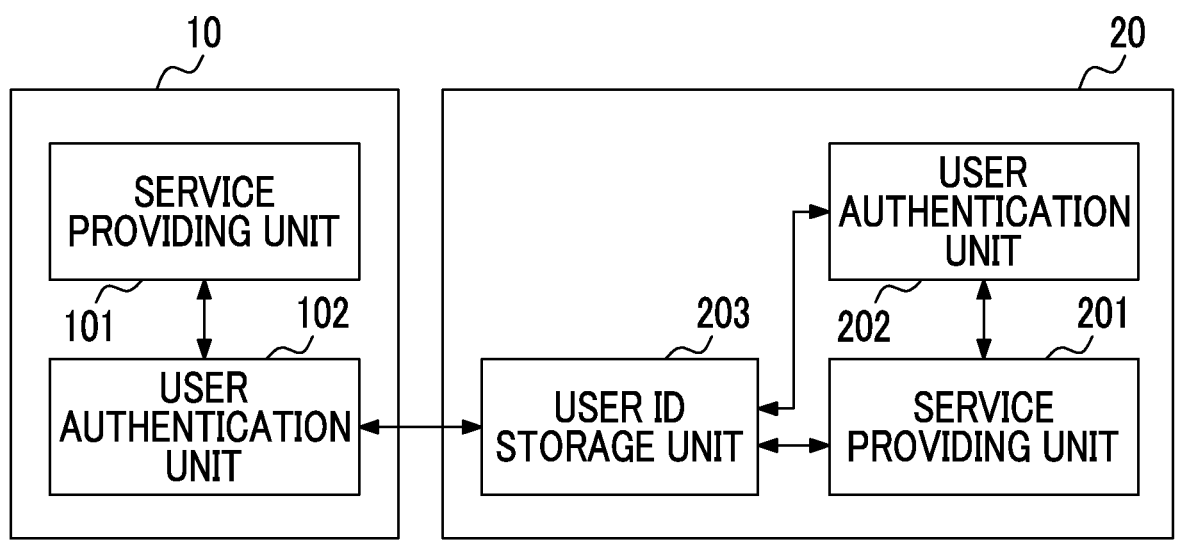
FIG. 4 is a diagram illustrating a functional configuration realized in the authentication cooperation system.

FIG. 4 illustrates a functional configuration realized in the authentication cooperation system 1. The ID management service apparatus 10 includes a service providing unit 101 and a user authentication unit 102. The cloud service apparatus 20 includes a service providing unit 201, a user authentication unit 202, and a user identification (ID) storage unit 203.

Each of the service providing unit 101 of the ID management service apparatus 10 and the service providing unit 201 of the cloud service apparatus 20 provides a service to a user who is registered and authenticated in the ID management service apparatus 10 or the cloud service apparatus 20. The user registered in the ID management service apparatus 10 or the cloud service apparatus 20 is a user registered as a user of the service provided by the ID management service apparatus 10 or the cloud service apparatus 20.

The services provided by the service providing unit 101 and the service providing unit 201 are services, which can be provided to the service-use user terminal 40 that is accessed via the communication line 2, and include, for example, a translation service, an image providing service, a music providing service, a game providing service, an information (news, weather information, traffic information, accommodation information, or the like) providing service, a mail order service, and the like.

The user authentication unit 102 of the ID management service apparatus 10 authenticates the user who is registered in the ID management service apparatus 10 by a first authentication method. The user authentication unit 202 of the cloud service apparatus 20 authenticates the user registered in the cloud service apparatus 20 by a second authentication method. The first authentication method is an example of a "first method" according to the present disclosure, and the second authentication method is an example of a "second method" according to the present disclosure. The user authentication unit 102 is an example of a "first authentication unit" according to the present disclosure, and the user authentication unit 202 is an example of a "second authentication unit" according to the present disclosure.

The user authentication unit 102 and the user authentication unit 202 authenticate the user using, for example, one or more pieces of information (hereinafter, referred to as "login information") among identification information such as a user ID and a password that the user knows, possession information obtained from a device (an IC card, a one-time password creation device, or the like) possessed by the user, biometric information representing the user's own feature (a fingerprint, an iris, a face, a vein, or the like), and the like.

The login information of the first authentication method and the login information of the second authentication method may be different or the same. In the present exemplary embodiment, in the first authentication method, possession information called a one-time password is used as login information in addition to identification information such as a user ID and a password. Further, in the second authentication method, only the identification information such as a user ID and a password is used as the login information. The user authentication unit 102 displays a login screen for authenticating the user by the first authentication method, for example, on the service-use user terminal 40 that accesses the ID management service apparatus 10.

FIG. 5 illustrates an example of a login screen. The user authentication unit 102 displays a text string "Please log in", a user name input field A11, a password input field A12, and a one-time password input field A13. A switching button B1 with an explanation "login by first authentication method" will be described later. In a state where the service user possesses a one-time password creation device, in a case where the service user inputs a user name and a password registered in the ID management service apparatus 10 and a one-time password, the user authentication unit 102 authenticates the service user.

In a case where the user is authenticated by the first authentication method as described above, the user authentication unit 102 supplies, for example, authenticated user information indicating the authenticated user to the service providing unit 101. The service providing unit 101 provides a service to the user indicated by the authenticated user information which is supplied, that is, the user authenticated by the user authentication unit 102. The service providing unit 101 is an example of a "first providing unit" according to the present disclosure.

The user authentication unit 202 of the cloud service apparatus 20 displays a login screen for authenticating the user by the first authentication method or the second authentication method, for example, on the service-use user terminal 40 that accesses the cloud service apparatus 20.

FIG. 6 illustrates another example of the login screen. The user authentication unit 202 displays a text string "Please log in", a user name input field A21, and a password input field A22.

A switching button B2 with an explanation "login by first authentication method" will be described later. In a case where the service user inputs, in each input field, a user name and a password registered in the cloud service apparatus 20, the user authentication unit 202 authenticates the service user. In a case where the user is authenticated by the second authentication method as described above, the user authentication unit 202 supplies, for example, authenticated user information indicating the authenticated user to the service providing unit 201. The service providing unit 201 provides a service to the user indicated by the authenticated user information which is supplied, that is, the user authenticated by the user authentication unit 202. The service providing unit 201 is an example of a "second providing unit" according to the present disclosure.

In a case where a condition determined according to the second authentication method is satisfied, the user ID storage unit 203 of the cloud service apparatus 20 performs processing of associating the user identification information in the first authentication method with the user identification information in the second authentication method. The user ID storage unit 203 is an example of a "processing unit" according to the present disclosure. The "condition" is a condition for cooperation of the authentication function, and is hereinafter referred to as a "cooperation condition".

The user identification information is information that is used for identifying a registered user, and is, for example, a user ID. In the present exemplary embodiment, the user ID storage unit 203 determines whether or not association is necessary based on the cooperation condition that is satisfied in a case where a security level of the first authentication method is equal to or higher than a security level of the second authentication method. The security level refers to a degree of a security maintenance state of a system or the like. As the security level becomes higher, the security maintenance state is more likely to be kept.

The security maintenance state is, for example, a state where information stored in a system or the like is kept in a confidential state without being leaked to the outside. In a case of user authentication, an illegal access in which a third party impersonates a registered user and tries to be authenticated is likely to occur. As the number of types of login information used for authentication is fewer, a case where a third party impersonates a registered user is more likely to occur. On the other hand, as the number of types of login information used for authentication is more, a case where a third party impersonates a registered user is less likely to occur, and thus an illegal access is less likely to Occur.

For this reason, in the present exemplary embodiment, it is assumed that the security level is higher as the number of pieces of login information used for authentication, such as identification information, possession information, and biometric information, is more. In the authentication cooperation system 1, it is assumed that three pieces of information including a user ID, a password, and a one-time password are used in the first authentication method, and that two pieces of information including a user ID and a password are used in the second authentication method.

Therefore, the user ID storage unit 203 determines that the security level of the first authentication method is equal to or higher than the security level of the second authentication method, and performs processing of associating the user identification information in the first authentication method with the user identification information in the second authentication method.

FIG. 7 illustrates an example of the associated user identification information. In the example of FIG. 7, the user ID storage unit 203 creates an ID table in which the registered user ID of the first authentication method and the registered user ID of the second authentication method are associated with each other.

The processing of associating pieces of the identification information by the user ID storage unit 203 is performed based on an operation of a management user, for example, on the management user terminal 30. The management user performs, on the management user terminal 30, an operation of registering the ID management service apparatus 10, for example, as a new service apparatus that cooperates for the authentication function. The management user terminal 30 requests the cloud service apparatus 20 to register the ID management service apparatus 10.

The user ID storage unit 203 of the cloud service apparatus 20 acquires the authentication method (first authentication method) of the ID management service apparatus 10 and first registration information indicating the user ID of the user registered in the ID management service apparatus 10. Further, the user ID storage unit 203 acquires the authentication method (second authentication method) of the cloud service apparatus 20 and second registration information indicating the user ID of the user registered in the cloud service apparatus 20.

The user ID storage unit 203 determines whether or not the cooperation condition is satisfied based on the acquired first registration information and the acquired second registration information. In the present exemplary embodiment, the user ID storage unit 203 determines that the security level of the first authentication method is equal to or higher than the security level of the second authentication method as described above, and creates the ID table illustrated in FIG. 7 by performing processing of associating the user ID of the ID management service apparatus 10 requested to be registered with the user ID of the cloud service apparatus 20.

The switching button B2 illustrated in FIG. 6 is displayed on the login screen of the authentication function associated with the user ID in the ID table. In a case where the service user operates the switching button B2, the user authentication unit 202 switches the display to the service providing screen illustrated in FIG. 5. After the switching is performed, in a case where the first authentication method satisfies the cooperation condition determined according to the second authentication method, the service providing unit 201 also provides the service to the user authenticated by the user authentication unit 102 by the first authentication method.

In a case where the switching button B2 is operated, the cloud service apparatus 20 provides the service to the user authenticated by the first authentication method. In preparation for this case, first, the user authentication unit 202 inquires the first authentication method required for authenticating the user. The user authentication unit 202 in this case is an example of an "inquiry unit" according to the present disclosure. The user authentication unit 202 acquires information indicating the first authentication method by, for example, inquiring the first authentication method of the ID management service apparatus 10.

The user authentication unit 202 also acquires information indicating the second authentication method stored in the cloud service apparatus 20, and determines whether or not the first authentication method satisfies the cooperation condition. In a case where it is determined that the first authentication method satisfies the cooperation condition, the user authentication unit 202 determines that the case is a case where the cloud service apparatus 20 provides the service to the user authenticated by the first authentication method, and displays the switching button B2. In a case where the switching button B2 is operated, the user authentication unit 202 displays the login screen for authenticating the user by the first authentication method based on the acquired information.

The case where the login screen is displayed is a case where the first authentication method satisfies the cooperation condition determined according to the second authentication method, the first authentication method being acquired from a response to the inquiry. In this case, in a case where the registered user inputs correct information on the displayed login screen, the user authentication unit 202 authenticates the registered user. The service providing unit 201 of the cloud service apparatus 20 also provides the service to the user authenticated by the first authentication method.

With the above configuration, each apparatus included in the authentication cooperation system 1 performs cooperation processing of cooperating for the authentication function by associating the user ID and providing processing of providing the service to the user authenticated by the authentication function cooperated by the cooperation processing.

Figure 8:
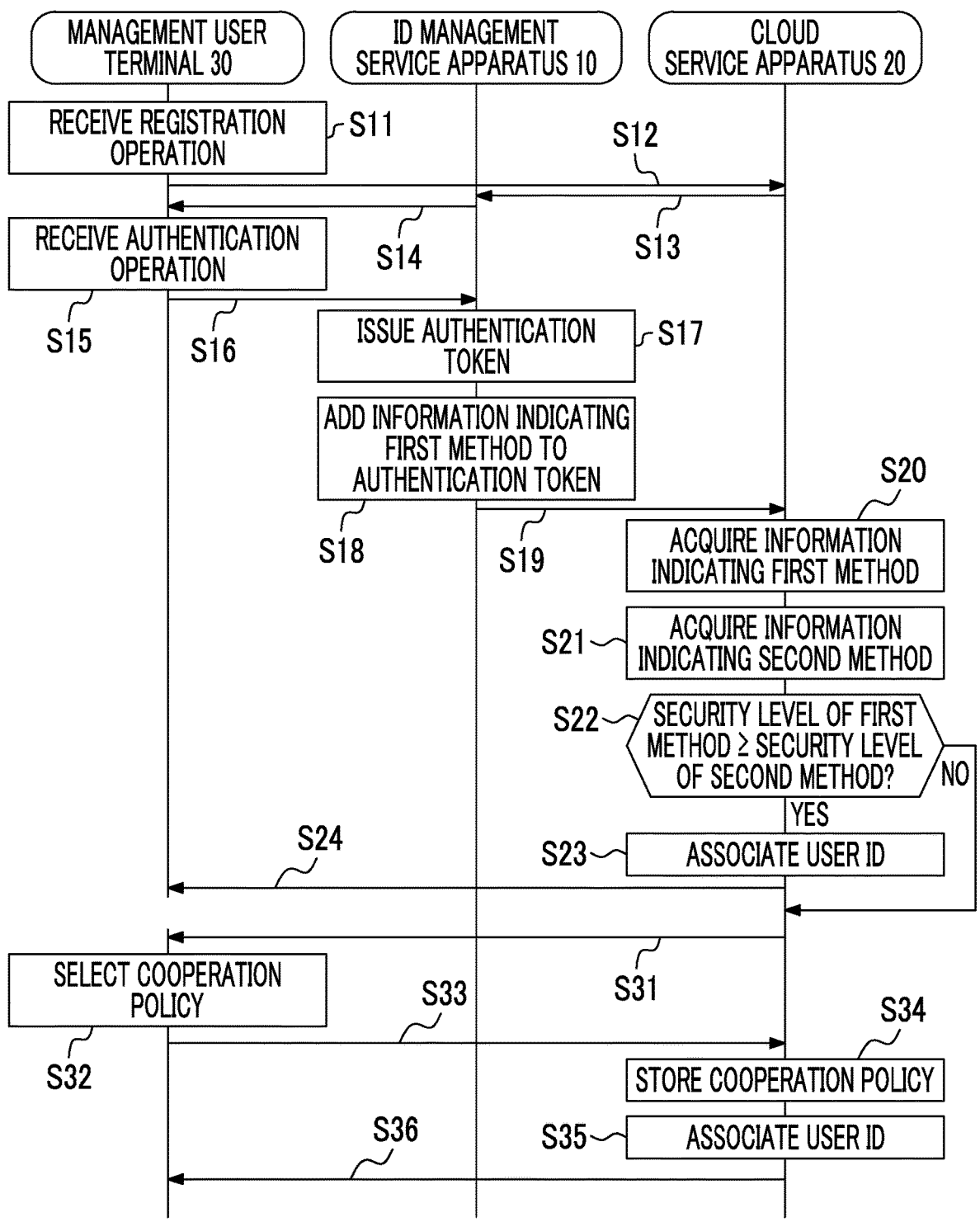
FIG. 8 is a diagram illustrating an example of an operation procedure in cooperation processing.

FIG. 8 illustrates an example of an operation procedure in the cooperation processing. The operation procedure is performed by the management user terminal 30, the ID management service apparatus 10, and the cloud service apparatus 20.

First, the management user terminal 30 receives an operation by the management user, the operation being an operation of registering the ID management service apparatus 10 as an apparatus that cooperates for the authentication function (step S11), and transmits registration request data for requesting registration, to the cloud service apparatus 20 (step S12). The cloud service apparatus 20 (user ID storage unit 203) transmits token request data for requesting an authentication token of the ID management service apparatus 10 that is requested to be registered, to the ID management service apparatus 10 (step S13).

The authentication token is information indicating that an apparatus storing the authentication token is an authenticated apparatus. In a case where the token request data is received, the ID management service apparatus 10 (user authentication unit 102) requests input of information required for authentication by transmitting a login screen to the management user terminal 30 (step S14). The management user terminal 30 receives an authentication operation by the management user (step S15), and transmits input login information (in the present exemplary embodiment, a user ID, a password, and a one-time password) to the ID management service apparatus 10 (step S16).

In a case where the login information is received, the ID management service apparatus 10 (user authentication unit 102) authenticates the management user and issues an authentication token (step S17). Next, the ID management service apparatus 10 (user authentication unit 102) adds information (for example, login information) indicating the first authentication method which is a login method of the ID management service apparatus 10, to the authentication token (step S18), and transmits the authentication token to the cloud service apparatus 20 (step S19).

The cloud service apparatus 20 (user ID storage unit 203) verifies and analyzes the transmitted authentication token, and acquires information indicating the first authentication method (step S20). Next, the cloud service apparatus 20 (user ID storage unit 203) acquires information (for example, login information) indicating the second authentication method stored in the cloud service apparatus 20 (step S21). Subsequently, the cloud service apparatus 20 (user ID storage unit 203) determines whether or not the security level of the first authentication method is equal to or higher than the security level of the second authentication method (step S22).

In a case where the determination result in step S22 is YES, the cloud service apparatus 20 (user ID storage unit 203) creates an ID table in which the registered user ID of the first authentication method and the registered user ID of the second authentication method are associated with each other (step S23). The cloud service apparatus 20 (user ID storage unit 203) transmits completion data indicating that registration of the ID management service apparatus 10 is completed, to the management user terminal 30 (step S24).

In a case where the determination result in step S22 is NO, the cloud service apparatus 20 (user ID storage unit 203) transmits, to the management user terminal 30, selection request data for requesting selection of an authentication method (hereinafter, referred to as a "cooperation policy") required for performing authentication cooperation for the service of the first authentication method that does not satisfy the cooperation condition (step S31). As the cooperation policy, for example, additional login information is used.

As the additional login information, for example, one or more pieces of information among the identification information, the possession information, the biometric information, and the like may be used. The selection request data represents a plurality of cooperation policies, and the management user terminal 30 displays the plurality of cooperation policies. The management user terminal 30 receives an operation by the management user, the operation being an operation of selecting any one of the plurality of cooperation policies (step S32).

Next, the management user terminal 30 transmits notification data for notification of the selected cooperation policy, to the cloud service apparatus 20 (step S33). The cloud service apparatus 20 (user ID storage unit 203) stores the received cooperation policy (step S34). In step S35 and step S36, the cloud service apparatus 20 (user ID storage unit 203) performs the same operations as step S22 (user ID association) and step S23 (completion data transmission).

Figure 9:
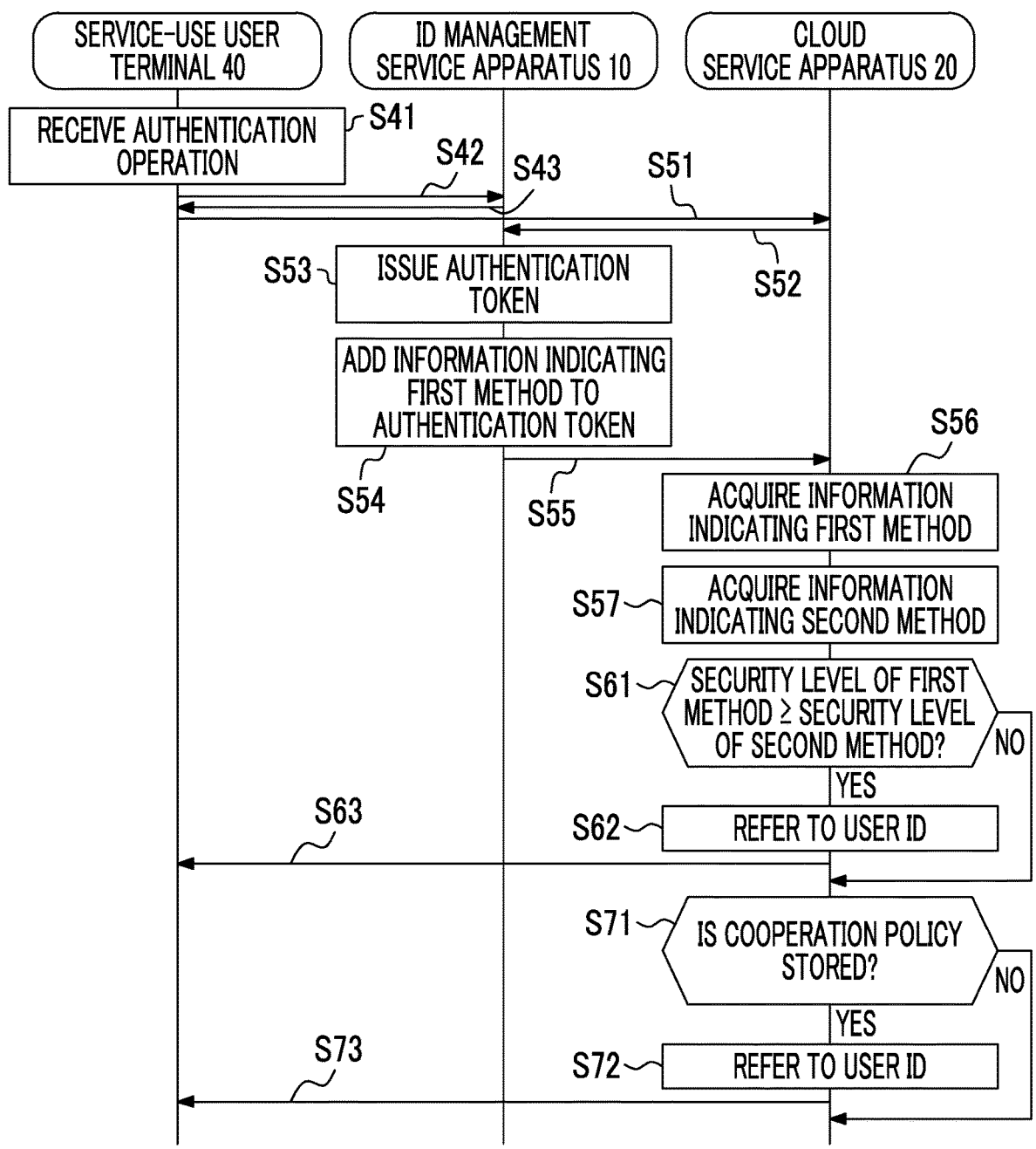
FIG. 9 is a diagram illustrating an example of an operation procedure in providing processing.

FIG. 9 illustrates an example of an operation procedure in the providing processing. The operation procedure is performed by the service-use user terminal 40, the ID management service apparatus 10, and the cloud service apparatus 20. First, the service-use user terminal 40 receives an authentication operation by the service user (step S41), and transmits input login information (in the present exemplary embodiment, a user ID, a password, and a one-time password) to the ID management service apparatus 10 (step S42).

In a case where the login information is received, the ID management service apparatus 10 (user authentication unit 102) authenticates the service user and transmits an authentication token to the service-use user terminal 40 (step S43). The service-use user terminal 40 stores the transmitted authentication token, and thus the service-use user terminal 40 is logged in the ID management service apparatus 10. Here, it is assumed that the service user performs an operation of displaying the login screen of the cloud service apparatus 20 on the service-use user terminal 40.

The service-use user terminal 40 transmits screen request data indicating a request for the login screen and the ID management service apparatus 10 that provides the authentication function indicated by the stored authentication token, to the cloud service apparatus 20 (step S51). The cloud service apparatus 20 (user authentication unit 202) transmits token request data for requesting an authentication token, to the ID management service apparatus 10 as a service apparatus that provides the authentication function indicated by the received screen request data (step S52).

The ID management service apparatus 10 (user authentication unit 102) issues an authentication token according to a request indicated by the received token request data (step S53). Next, the ID management service apparatus 10 (user authentication unit 102) adds information indicating the first authentication method to the issued authentication token (step S54), and transmits the authentication token to which the information indicating the first authentication method is added, to the cloud service apparatus 20 (step S55).

The cloud service apparatus 20 (user authentication unit 202) verifies and analyzes the received authentication token, and acquires information indicating the first authentication method (step S56). Next, the cloud service apparatus 20 (user authentication unit 202) acquires information (for example, login information) indicating the second authentication method stored in the cloud service apparatus 20 (step S57). Subsequently, the cloud service apparatus 20 (user authentication unit 202) determines whether or not the security level of the first authentication method is equal to or higher than the security level of the second authentication method (step S61).

In a case where the determination result in step S61 is YES, the cloud service apparatus 20 (service providing unit 201) refers to the registered user ID stored in the ID table stored in the cloud service apparatus 20 (step S62). Specifically, the cloud service apparatus 20 (service providing unit 201) refers to the registered user ID of the first authentication method associated with the registered user ID of the second authentication method.

The cloud service apparatus 20 (service providing unit 201) transmits data related to the service registered for the registered user ID which is referred to, to the service-use user terminal 40 (step S63), and starts to provide the service. In a case where the determination result in step S61 is NO, the cloud service apparatus 20 (service providing unit 201) determines whether or not the cooperation policy is stored in the cloud service apparatus 20 (step S71).

In a case where the determination result in step S71 is YES, in step S72 and step S73, the cloud service apparatus 20 (service providing unit 201) performs the same operations as step S62 (referring to user ID) and step S63 (starting of service providing). As described above, in the present exemplary embodiment, the cooperation condition is satisfied in a case where the security level of the first authentication method is equal to or higher than the security level of the second authentication method.

Thereby, it is possible to prevent a decrease in safety of the service provided by the cloud service apparatus 20. On the other hand, even in a state where the security level of the first authentication method is lower than the security level of the second authentication method, in a case where a specific authentication method (an authentication method selected in the cooperation policy) is added to the first authentication method, the cooperation condition is satisfied. Therefore, in the service provided by the cloud service apparatus 20, minimum safety (safety by the added specific authentication method) is ensured.

Further, in the present exemplary embodiment, in the cooperation processing illustrated in FIG. 8, processing of associating a user ID is performed in advance for cooperation of the authentication function. Thereby, the cloud service apparatus 20 does not need to confirm the presence or absence of cooperation to an external apparatus in a case where authentication is actually performed by the cooperated authentication method. Thus, as compared with a case where the association processing is not performed, the service is more quickly provided.

In the service provided to the user authenticated in another service, such as the service provided by the cloud service apparatus 20, unless users for whom the service can be provided are limited, the service is provided, for example, to users with a low security level. As a result, a risk such as information leakage may occur. In the present exemplary embodiment, users for whom the service is provided are limited as described above, and thus safety in service providing is improved as compared with a case where users for whom the service is provided are not limited.

2. Modification Example

The above-described exemplary embodiment is merely an example of the configuration of the present disclosure, and may be modified as follows. Further, the exemplary embodiment and modification examples may be combined with each other as necessary.

2-1. Security Level

In the exemplary embodiment, as the number of pieces of the login information used for authentication becomes larger, the security level becomes higher. On the other hand, the security level determination method is not limited thereto. For example, even in a case where the information used as the login information is individually compared, the security level may be high or low.

For example, in a case where passwords having the same type are used as the login information, as the number of characters becomes larger, the security level becomes higher. In addition, a use period of a one-time password is shorter than a simple password, and thus the security level of the one-time password is higher. Further, even in the authentication function having a low security level, in a case where the authentication function is performed in a plurality of times, the security level may become higher than the authentication having a high security level. For example, in a case where five passwords are used, the security level may be higher than in a case where only one piece of biometric information is used.

In consideration of these points, for example, a point indicating highness of a security level may be set for each login information, and the security level may be determined based on the total value of the points of the login information used for authentication. The point may be set based on experience of an engineer who manages security, or may be set based on a record of an illegal access in a system that uses the login information.

2-2. Cooperation Policy

The cooperation policy for performing authentication cooperation for the service of the authentication method that does not satisfy the cooperation condition is not limited to the cooperation policy (additional login information) described in the exemplary embodiment. For example, as the cooperation policy, without adding another login information, a method of strengthening the login information originally used may be used.

The method of strengthening the login information is, for example, a method of changing the number of digits of the password from 8 characters to 20 characters or changing fingerprint authentication from one fingerprint to three or more fingerprints. In short, in a case where the security level of the first authentication method is lower than the security level of the second authentication method, any cooperation policy may be used as long as the cooperation policy improves the security level of the first authentication method such that safety in the service of the second authentication method is not decreased.

2-3. Functional Configuration

The method for realizing the function illustrated in FIG. 4 in the authentication cooperation system 1 is not limited to the method described in the exemplary embodiment. For example, the cloud service apparatus 20 may include all the components in one housing, or may include the components distributed in two or more housings, such as computer resources provided by a cloud service.

In addition, for example, the user ID storage unit 203 performs processing of associating the user ID and processing of notifying and storing the cooperation policy. On the other hand, pieces of the processing may be performed by different functions. Further, for example, operations performed by the service providing unit 101 and the user authentication unit 102 may be performed by one function. In short, as long as the functions illustrated in FIG. 4 are realized as the entire authentication cooperation system, a configuration of an apparatus that realizes each function and a range of an operation performed by each function may be freely determined.

2-4. Processor

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

2-5. Category of Present Disclosure

The present disclosure is understood as each information processing apparatus such as the ID management service apparatus 10, the cloud service apparatus 20, the management user terminal 30, and the service-use user terminal 40, and an information processing system (the authentication cooperation system 1 is an example of the information processing system) including the information processing apparatuses. Further, the present disclosure is understood as an information processing method for realizing processing performed by each information processing apparatus, and is also understood as a program for causing a computer to control each information processing apparatus. The program may be provided in a form of a recording medium such as an optical disc storing the program, or may be provided by being downloaded to a computer via a communication line such as the Internet and being installed for use.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system comprising:
a first authentication unit that authenticates a user by a first method;
a first providing unit that provides a first service to the user authenticated by the first authentication unit;
a second authentication unit that authenticates a user by a second method; and
a second providing unit that provides a second service, which is different from the first service, to the user authenticated by the second authentication unit and also provides a service to the user authenticated by the first authentication unit in a case where the first method satisfies a condition determined according to the second method, wherein
the first authentication unit authenticates the user by the first method using first login information, wherein the first login information comprising possession information and first identification information; and
the second authentication unit authenticates the user by the second method using second login information, wherein the second login information comprising second identification information.

2. The information processing system according to claim 1,
wherein the condition is satisfied in a case where a security level of the first method is equal to or higher than a security level of the second method.

3. The information processing system according to claim 1,
wherein the condition is satisfied in a case where a specific authentication method is added to the first method.

4. The information processing system according to claim 1, further comprising:
a processing unit that performs processing of associating user identification information in the first method with user identification information in the second method in a case where the condition is satisfied.

5. The information processing system according to claim 2, further comprising:
a processing unit that performs processing of associating user identification information in the first method with user identification information in the second method in a case where the condition is satisfied.

6. The information processing system according to claim 3, further comprising:
a processing unit that performs processing of associating user identification information in the first method with user identification information in the second method in a case where the condition is satisfied.

7. The information processing system according to claim 1,
wherein the first authentication unit displays a first login screen for authenticating the user by the first method,
wherein the second authentication unit displays a second login screen for authenticating the user by the first method or the second method.

8. The information processing system according to claim 1,
wherein the first authentication unit authenticates the user by the first method using first login information,
wherein the second authentication unit authenticates the user by the second method using second login information,
wherein the condition is satisfied in a case where a first security level of the first method is equal to or higher than a second security level of the second method,
wherein the first security level corresponds to a first number of pieces of information in the first login information, and the second security level corresponds to a second number of pieces of information in the second login information.

9. The information processing system according to claim 1,
wherein the condition is satisfied in a case where a specific authentication method is added to the first method,
wherein the specific authentication method is selected in a cooperation policy for performing authentication cooperation of the first method, wherein the cooperation policy ensures minimum safety for the service.

10. An information processing apparatus comprising:
an inquiry unit that inquires a first method in a case where a service providing apparatus provides a first service to a user authenticated by the first method;
a first authentication unit that authenticates the user by the first method using first login information, wherein the first login information comprising possession information and first identification information;
a second authentication unit that authenticates a user by a second method; and
a providing unit that provides a second service, which is different from the first service, to the user authenticated by the second authentication unit and also provides a service to the user authenticated by the first method in a case where the first method obtained from a response to the inquiry satisfies a condition determined according to the second method, wherein
the second authentication unit authenticates the user by the second method using second login information, wherein the second login information comprising second identification information.

11. A non-transitory computer readable medium storing a program causing a computer to function as:
an inquiry unit that inquires a first method in a case where a service providing apparatus provides a first service to a user authenticated by the first method;
a first authentication unit that authenticates the user by the first method using first login information, wherein the first login information comprising possession information and first identification information;
a second authentication unit that authenticates a user by a second method; and
a providing unit that provides a second service, which is different from the first service, to the user authenticated by the second authentication unit and also provides a service to the user authenticated by the first method in a case where the first method obtained from a response to the inquiry satisfies a condition determined according to the second method, wherein
the second authentication unit authenticates the user by the second method using second login information, wherein the second login information comprising second identification information.

* * * * *